United States Patent
Xue et al.

(10) Patent No.: US 12,350,966 B2
(45) Date of Patent: Jul. 8, 2025

(54) MATERIAL VEHICLE, TRACTION APPARATUS AND SYSTEM, AND METHOD FOR CONTROLLING BIDIRECTIONAL TRAVELING OF MATERIAL VEHICLE

(71) Applicant: BEIJING JINGDONG QIANSHI TECHNOLOGY CO., LTD., Beijing (CN)

(72) Inventors: Ningbo Xue, Beijing (CN); Jinxing Hu, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/245,630

(22) PCT Filed: Sep. 13, 2021

(86) PCT No.: PCT/CN2021/118061
§ 371 (c)(1),
(2) Date: Mar. 16, 2023

(87) PCT Pub. No.: WO2022/089059
PCT Pub. Date: May 5, 2022

(65) Prior Publication Data
US 2023/0331322 A1 Oct. 19, 2023

(30) Foreign Application Priority Data
Oct. 30, 2020 (CN) .......................... 202011189222.4

(51) Int. Cl.
*B60B 33/02* (2006.01)
*B60P 3/00* (2006.01)
*B62D 53/00* (2006.01)
*B65G 1/04* (2006.01)
*B65G 1/137* (2006.01)

(52) U.S. Cl.
CPC .............. *B60B 33/02* (2013.01); *B60P 3/007* (2013.01); *B62D 53/005* (2013.01); *B65G 1/0492* (2013.01); *B65G 1/137* (2013.01)

(58) Field of Classification Search
CPC ....... B60B 33/02; B60P 3/007; B62D 53/005; B65G 1/0492; B65G 1/137
See application file for complete search history.

(56) References Cited

U.S. PATENT DOCUMENTS

| | | | |
|---|---|---|---|
| 10,241,516 B1 | 3/2019 | Brady | |
| 2018/0281178 A1 | 10/2018 | Jacobsen | |
| 2019/0308856 A1* | 10/2019 | Wright | ................ B65G 1/0492 |

FOREIGN PATENT DOCUMENTS

| CN | 107554646 A | 1/2018 |
|---|---|---|
| CN | 108674225 A | 10/2018 |

(Continued)

OTHER PUBLICATIONS

JP2005297809A Machine English Translation (Year: 2005).*
(Continued)

*Primary Examiner* — Jason D Shanske
*Assistant Examiner* — Matthew James O'Neill
(74) *Attorney, Agent, or Firm* — Finch & Maloney PLLC

(57) ABSTRACT

A material vehicle, a traction apparatus and system, a method for controlling the bidirectional traveling of a material vehicle, and a storage medium. A material vehicle (10) comprises a vehicle body (101), an unlocking assembly (102), a plurality of front universal wheels (103) and a plurality of rear universal wheels (104), wherein the plurality of front universal wheels (103) and the plurality of rear universal wheels (104) are all in a locked state; the vehicle body (101) is used for placing a target article; the unlocking assembly (102) is used for releasing the plurality of front universal wheels (103) from the locked state when same are in a horizontal rotation direction, and controlling the mate- (Continued)

rial vehicle (10) to travel in a first direction by means of the plurality of front universal wheels (103); and the unlocking assembly (102) is further used for releasing the plurality of rear universal wheels (104) from the locked state when same are in the horizontal rotation direction, and controlling the material vehicle (10) to travel in a second direction by means of the plurality of rear universal wheels (104), the first direction and the second direction being opposite to each other. By means of the unlocking assembly, the plurality of front universal wheels or the plurality of rear universal wheels can be released from the locked state thereof, such that the material vehicle can change the positions of driving wheels, and bidirectional traveling can be realized without needing to turn the material vehicle around.

15 Claims, 6 Drawing Sheets

(56) References Cited

FOREIGN PATENT DOCUMENTS

| | | | |
|---|---|---|---|
| CN | 208291256 U | | 12/2018 |
| CN | 209972630 U | | 1/2020 |
| CN | 111376649 A | | 7/2020 |
| CN | 211001598 U | | 7/2020 |
| CN | 112340338 A | | 2/2021 |
| EP | 3564098 A1 | | 11/2019 |
| JP | 11171010 A | * | 6/1999 |
| JP | H11171010 A | | 6/1999 |
| JP | 2004249896 A | * | 9/2004 |
| JP | 2005297809 A | * | 10/2005 |
| JP | 2005327236 A | * | 11/2005 |
| JP | 2009061908 A | | 3/2009 |
| JP | 2016147606 A | * | 8/2016 |

OTHER PUBLICATIONS

JP-2004249896-A Machine English Translation (Year: 2004).*
JP-2005327236-A Machine English Translation (Year: 2005).*
JP-11171010-A Machine English Translation (Year: 1999).*
JP-2016147606-A Machine English Translation (Year: 2016).*
International Search Report in the international application No. PCT/CN2021/118061, mailed on Dec. 3, 2021.
English translation of the Written Opinion of the International Search Authority in the international application No. PCT/CN2021/118061, mailed on Dec. 3, 2021.
Supplementary European Search Report in the European application No. 21884789.5, mailed on Jan. 18, 2024. 9 pages.

* cited by examiner

MATERIAL VEHICLE, TRACTION APPARATUS AND SYSTEM, AND METHOD FOR CONTROLLING BIDIRECTIONAL TRAVELING OF MATERIAL VEHICLE

CROSS-REFERENCE TO RELATED APPLICATION

The present disclosure claims priority to Chinese patent application No. 202011189222.4, filed to China National Intellectual Property Administration on Oct. 30, 2020 and entitled "MATERIAL VEHICLE, TRACTION APPARATUS AND SYSTEM, AND METHOD FOR CONTROLLING BIDIRECTIONAL TRAVELING OF MATERIAL VEHICLE", the entire disclosure of which is hereby incorporated by reference in its entirety.

TECHNICAL FIELD

The disclosure relates to the technical field of material storage, and in particular to a material vehicle, a traction apparatus, a system, a method for controlling a bidirectional travelling of the material vehicle and a computer storage medium.

BACKGROUND

A Material vehicle (or called a skip vehicle) is an apparatus for transporting production materials over a short distance. With the development of automatic logistics, an automated guided vehicle (AGV) is generally used for towing the material vehicle for goods transport. At present, types of AGV may be divided into a unidirectional travelling type and a bidirectional travelling type. In related art, the unidirectional travelling type of AGV may only tow the material vehicle to travel in a single direction, and may not be adapted to a scenario where the material vehicle needs to travel bi-directionally. Although the bidirectional travelling type of AGV may tow the material vehicle to travel in two opposite directions, the bidirectional travelling type of AGV is costly and not widely used in practice.

SUMMARY

The disclosure provides a material vehicle, a traction apparatus, a system, a method for controlling a bidirectional travelling of the material vehicle and a computer storage medium. The material vehicle may unlock multiple front universal wheels or multiple rear universal wheels from a locked state through an unlocking assembly of the material vehicle, so that a bidirectional travelling may be realized without turning around.

The technical solution of the disclosure is implemented as follows.

In a first aspect, embodiments of the disclosure provide a material vehicle. The material vehicle includes a vehicle body, an unlocking assembly, multiple front universal wheels and multiple rear universal wheels. The unlocking assembly, the multiple front universal wheels and the multiple rear universal wheels are connected to a bottom of the vehicle body, and the multiple front universal wheels and the multiple rear universal wheels are in a locked state.

The vehicle body is configured to place a target object.

The unlocking assembly is configured to unlock the multiple front universal wheels from the locked state in a horizontal rotation direction, and drive the material vehicle to travel in a first direction through the multiple front universal wheels.

The unlocking assembly is further configured to unlock the multiple rear universal wheels from the locked state in the horizontal rotation direction, and drive the material vehicle to travel in a second direction through the multiple rear universal wheels, and wherein the first direction is opposite to the second direction.

In a second aspect, embodiments of the disclosure provide a traction apparatus, the traction apparatus at least includes a vehicle body and a traction assembly. The traction assembly is connected to a top of the vehicle body.

The traction assembly is configured to, after engaging with a material vehicle, control the material vehicle to travel in a first direction, or control the material vehicle to travel in a second direction.

In a third aspect, embodiments of the disclosure provide a material vehicle system. The material vehicle system at least includes a material vehicle provided in the first aspect and a traction apparatus provided in the second aspect.

The traction apparatus is configured to tow the material vehicle to travel in the first direction, and tow the material vehicle to travel in the second direction after turning around by rotating in a bottom space of the material vehicle. The first direction is opposite to the second direction.

In a fourth aspect, embodiments of the disclosure provide a method for controlling a bidirectional travelling of a material vehicle, applied to a material vehicle system including a traction apparatus and the material vehicle. The material vehicle at least includes an unlocking assembly, multiple front universal wheels and multiple rear universal wheels. The multiple front universal wheels and the multiple rear universal wheels are in a locked state. The method includes the following operations.

The traction apparatus is controlled to establish a traction connection with the material vehicle and the traction apparatus is controlled to travel in a target direction.

In response to the traction apparatus travelling in the target direction, the unlocking assembly is controlled to unlock multiple target universal wheels from the locked state in a horizontal rotation direction, to enable the traction apparatus to drive the material vehicle to travel in the target direction. The multiple target universal wheels are the multiple front universal wheels when the target direction is a first direction, and the multiple target universal wheels are the multiple rear universal wheels when the target direction is a second direction. The first direction is opposite to the second direction.

In a fifth aspect, embodiments of the disclosure provide a computer storage medium having stored thereon a computer program that, when being executed, implements operations of the method provided in the fourth aspect.

The embodiments of the disclosure provide a material vehicle, a traction apparatus, a system, a method for controlling a bidirectional travel of the material vehicle and a computer storage medium. The material vehicle includes a vehicle body, an unlocking assembly, multiple front universal wheels and multiple rear universal wheels. The unlocking assembly, the multiple front universal wheels and the multiple rear universal wheels are connected to a bottom of the vehicle body, and the multiple front universal wheels and the multiple rear universal wheels are in a locked state. The vehicle body is configured to place a target object. The unlocking assembly is configured to unlock the multiple front universal wheels from the locked state in a horizontal rotation direction, and drive the material vehicle to travel in a first direction through the multiple front universal wheels. The unlocking assembly is further configured to unlock the multiple rear universal wheels from the locked state in the horizontal rotation direction, and drive the material vehicle to travel in a second direction through the multiple rear universal wheels. The first direction is opposite to the second direction. In this way, the unlocking assembly may unlock the multiple front universal wheels from the locked state, to enable the multiple front universal wheels to serve as driving wheels. Alternatively, for the material vehicle, the unlocking assembly may unlock the multiple rear universal wheels from the locked state, to enable the multiple rear universal wheels to serve as the driving wheels. Therefore, the material vehicle can change the positions of the driving wheels and realize bidirectional travelling without turning around.

DETAILED DESCRIPTION

The technical solution in embodiments of the disclosure will be clearly and completely described in the following with reference to the drawings in the embodiments of the disclosure.

An automatic guided car, or called AGV or AGV car is a vehicle equipped with an electromagnetic or optical automatic guidance device or the like, which may travel along a specified guiding path, and have safety protection and various transfer functions, and a transport vehicle without drivers in industrial applications. A power source of the AGV is rechargeable battery.

Figure 1A:
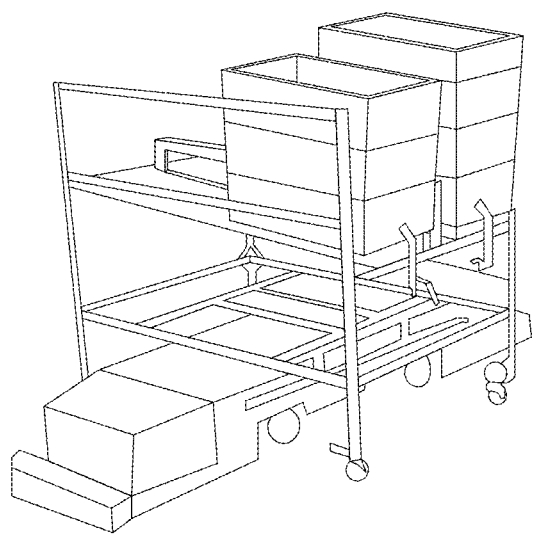
FIG. 1A is a photo schematic diagram of a latent AGV according to the related technical solution.
Figure 1B:
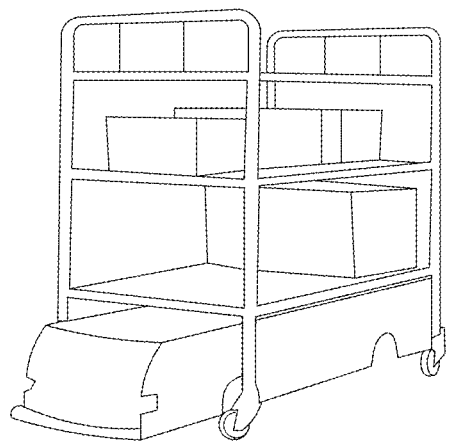
FIG. 1B is a photo schematic diagram of another latent AGV according to the related technical solution.
Figure 1C:
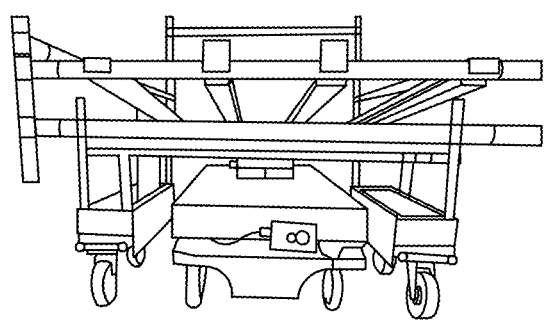
FIG. 1C is a photo schematic diagram of still another latent AGV according to the related technical solution.
Figure 1D:
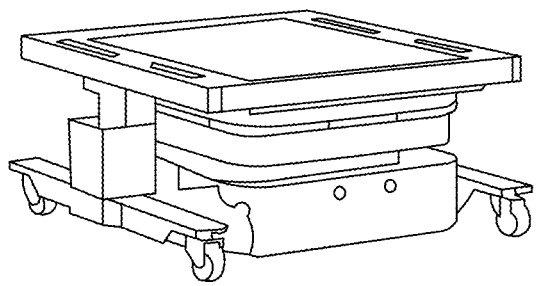
FIG. 1D is a photo schematic diagram of yet still another latent AGV according to the related technical solution.

In the field of logistics storage, a large number of material vehicles are used for transporting in manufacturing, although sizes of material vehicles in various industries are quite different, the AGVs with a standard size may be used for towing the material vehicles for automatic transport. FIG. 1A illustrates a photo schematic diagram of a latent AGV according to the related technical solution. FIG. 1B illustrates a photo schematic diagram of another latent AGV according to the related technical solution. FIG. 1C illustrates a photo schematic diagram of still another latent AGV according to the related technical solution. FIG. 1D illustrates a photo schematic diagram of yet still another latent AGV according to the related technical solution. FIG. 1A to FIG. 1D illustrate latent AGV examples of four different manufacturers, respectively. As illustrated in FIG. 1A to FIG. 1D, a vehicle body of the latent AGV is short and small, and may go under a bottom of a material vehicle to tow the material vehicle to travel, thus the latent AGV may be adapted to most material vehicles with different sizes and is widely used in automatic logistics. Because the vehicle body is relatively standardized, the quality and cost of AGV have more advantages, and the reusability of AGV can be extended only by manufacturing new material vehicles in customer manufacturing and equipment iteration. Therefore, the latent AGV is widely used and is also a main model in AGV manufacturers.

In related technologies, the latent AGV may be divided into a unidirectional travelling type and a bidirectional travelling type. The unidirectional travelling type of AGV may only tow the material vehicle to travel in a single direction, and the bidirectional travelling type of AGV may tow the material vehicle to travel in two opposite directions. The two types of AGV are discussed as followings.

(1) Although cost of the unidirectional travelling type of AGV is low, it may not be adapted to many scenarios where the material vehicle needs to travel bi-directionally, so the application scenario of the unidirectional travelling type of AGV is limited.

(2) Although the bidirectional travelling type of AGV may tow the material vehicle to travel bi-directionally, the AGV needs to be equipped with expensive safety sensors such as laser sensors and vision sensors at front and rear sides of the AGV. In addition, some AGVs need to install two more driving motors, resulting in high hardware cost and low return rate of customer investments.

(3) Due to an angle limitation of the laser sensor of the AGV, there is a blind area on a side of the material vehicle being towed by the AGV, which may lead to potential safety hazard when the material vehicle turns.

Based on the above, the embodiments of the disclosure provide a material vehicle, a basic idea of which is described as follows. The material vehicle includes a vehicle body, an unlocking assembly, multiple front universal wheels and multiple rear universal wheels. The unlocking assembly, the multiple front universal wheels and the multiple rear universal wheels are connected to a bottom of the vehicle body, and the multiple front universal wheels and the multiple rear universal wheels are in a locked state. The vehicle body is configured to place a target object. The unlocking assembly is configured to unlock the multiple front universal wheels from the locked state in a horizontal rotation direction, and drive the material vehicle to travel in a first direction through the multiple front universal wheels. The unlocking assembly is further configured to unlock the multiple rear universal wheels from the locked state in the horizontal rotation direction, and drive the material vehicle to travel in a second direction through the multiple rear universal wheels. The first direction is opposite to the second direction. In this way, the unlocking assembly may unlock the multiple front universal wheels from the locked state, to enable the multiple front universal wheels to serve as driving wheels. Alternatively, for the material vehicle, the unlocking assembly may unlock the multiple rear universal wheels from the locked state, to enable the multiple rear universal wheels to serve as the driving wheels. Therefore, the material vehicle can change the positions of the driving wheels and realize bidirectional travelling without turning around.

The embodiments of the disclosure will be described in detail below in combination with the accompanying drawings.

Figure 2:
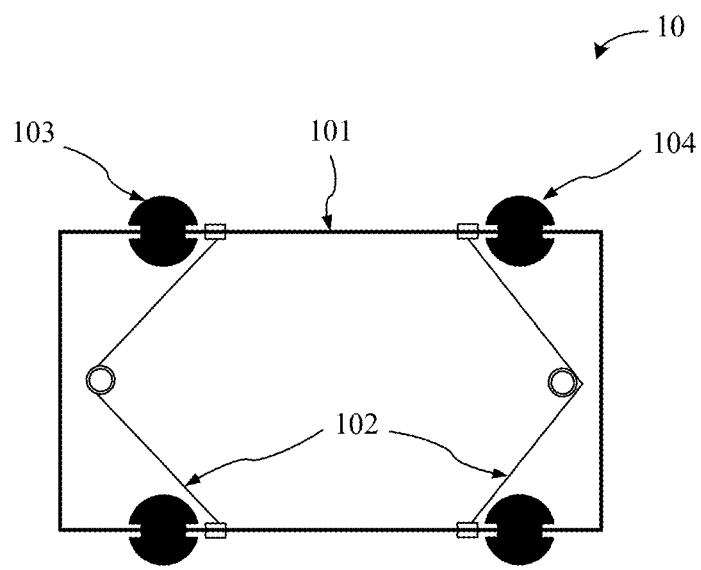
FIG. 2 is a schematic structural diagram of a material vehicle according to an embodiment of the disclosure.

In an embodiment of the disclosure, FIG. 2 illustrates a schematic structural diagram of a material vehicle according to an embodiment of the disclosure. As illustrated in FIG. 2, a material vehicle 10 includes a vehicle body 101, an unlocking assembly 102, multiple front universal wheels 103 and multiple rear universal wheels 104. The unlocking assembly 102, the multiple front universal wheels 103 and the multiple rear universal wheels 104 are connected to a bottom of the vehicle body 101. The multiple front universal wheels 103 and the multiple rear universal wheels 104 are in a locked state.

The vehicle body 101 is configured to place a target object.

The unlocking assembly 102 is configured to unlock the multiple front universal wheels 103 from the locked state in a horizontal rotation direction, and drive the material vehicle 10 to travel in a first direction through the multiple front universal wheels 103.

The unlocking assembly 102 is further configured to unlock the multiple rear universal wheels 104 from the locked state in the horizontal rotation direction, and drive the material vehicle 10 to travel in a second direction through the multiple rear universal wheels 104. The first direction is opposite to the second direction.

It is noted that, as illustrated in FIG. 2, the material vehicle 10 includes four parts, i.e., the vehicle body 101, the unlocking assembly 102, the multiple front universal wheels 103 and the multiple rear universal wheels 104. The unlocking assembly 102, the multiple front universal wheels 103 and the multiple rear universal wheels 104 are arranged on the bottom of the vehicle body 101, and the multiple front universal wheels 103 and the multiple rear universal wheels 104 are in the locked state. The locked state is a state in which horizontal rotation may not be performed, that is to say, the multiple front universal wheels 103 and the multiple rear universal wheels 104 may roll forward or backward, but may not rotate horizontally at will. It should be understood that a specific number of the multiple front universal wheels 103 and the multiple rear universal wheels 104 may be set as needs. Generally, two front universal wheels 103 and two rear universal wheels 104 may be set. In embodiments of the disclosure, "front" and "rear" are relative directions and are not specific directions specifically designated.

The vehicle body 101 is configured to place a target object and may be designed into a variety of sizes and types according to practical application scenarios, for example, an open type, a closed type, a layered structure or the like.

The unlocking assembly 102 is arranged on the vehicle body 101 and is configured to unlock the multiple front universal wheels 103 from the locked state in the horizontal rotation direction. When the multiple front universal wheels 103 are unlocked from the locked state in the horizontal rotation direction, the multiple front universal wheels 103 serve as driving wheels, while the multiple rear universal wheels 104 are equivalent to directional wheels, so that the material vehicle 10 may travel in the first direction.

The unlocking assembly 102 is further configured to unlock the multiple rear universal wheels 104 from the locked state in the horizontal rotation direction. When the multiple rear universal wheels 104 are unlocked from the locked state in the horizontal rotation direction, the multiple rear universal wheels 104 serve as driving wheels, while the multiple front universal wheels 103 are equivalent to directional wheels, so that the material vehicle 10 may travel in the second direction.

That is to say, an original state of the multiple front universal wheels 103 is the locked state and the multiple front universal wheels 103 may not rotate horizontally. After the unlocking assembly 102 unlocks the multiple front universal wheels 103 from the locked state in the horizontal rotation direction, the multiple front universal wheels 103 may rotate horizontally. In this case, the multiple front universal wheels 103 serve as driving wheels, while the multiple rear universal wheels 104 are equivalent to directional wheels, so that the material vehicle 10 may travel forward (i.e., in the first direction).

Similarly, the original state of the multiple rear universal wheels 104 is the locked state and the multiple rear universal wheels 104 may not rotate horizontally. After the unlocking assembly 102 unlocks the multiple rear universal wheels 104 from the locked state in the horizontal rotation direction, the multiple rear universal wheels 104 may rotate horizontally. In this case, the multiple rear universal wheels 104 serve as the driving wheels, while the multiple front universal wheels 103 are equivalent to the directional wheels, so that the material vehicle 10 may travel backward (i.e., in the second direction).

In this way, the material vehicle 10 may flexibly exchange the relative positions of the driving wheels and the directional wheels, so that the material vehicle 10 can travel in two opposite directions without turning around.

Figure 3:
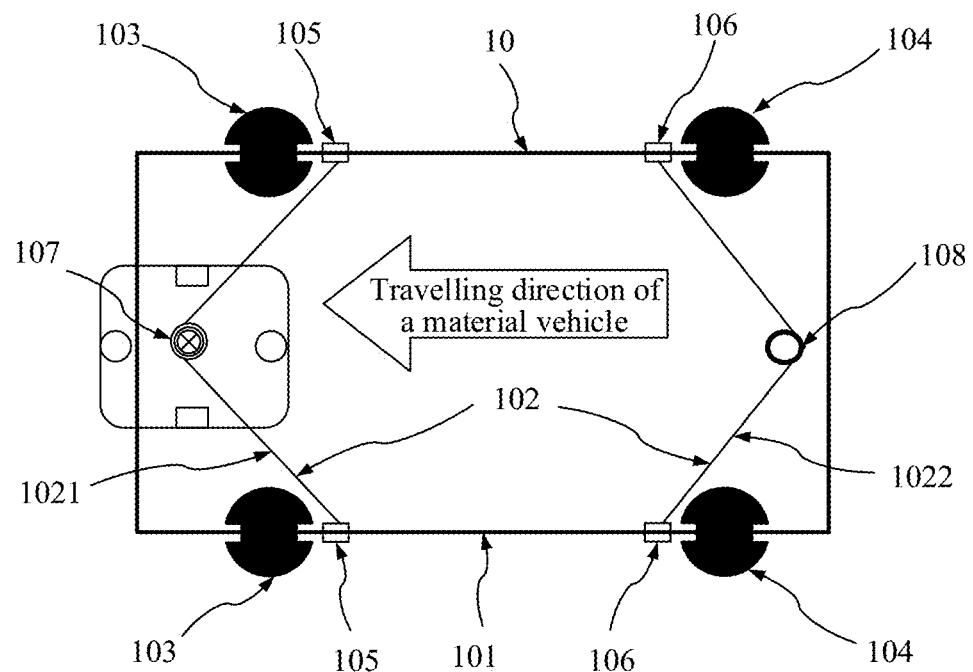
FIG. 3 is a schematic structural diagram of another material vehicle according to an embodiment of the disclosure.

Further, in some embodiments, FIG. 3 illustrates a schematic structural diagram of another material vehicle according to an embodiment of the disclosure. As illustrated in FIG. 3 the material vehicle 10 may further include a front locking device 105 and a rear locking device 106.

The front locking device 105 is connected to the multiple front universal wheels 103 and is configured to control the multiple front universal wheels 103 to be in the locked state in the horizontal rotation direction.

The rear locking device 106 is connected to the multiple rear universal wheels 104 and is configured to control the multiple rear universal wheels 104 to be in the locked state in the horizontal rotation direction.

It should be noted that, as illustrated in FIG. 3, the material vehicle 10 further includes the front locking device 105 and the rear locking device 106. The front locking device 105 is configured to lock the multiple front universal wheels 103, to control the multiple front universal wheels 103 to be in the locked state. The rear locking device 106 is configured to lock the multiple rear universal wheels 104, to control the multiple rear universal wheels 104 to be in the locked state.

It should also be noted that the front locking device 105 and the rear locking device 106 may include various specific forms, as long as the horizontal rotation function of the universal wheels can be locked, for example, the locking device may be implemented by a lateral shaft bracket of a rotation shaft which locks a universal wheel, or by the rotation shaft which locks the universal wheel. In addition, the front locking device 105 and the rear locking device 106 may have a same form or different forms.

Further, in some embodiments, as illustrated in FIG. 3, the unlocking assembly 102 may include a front connecting rod device 1021 and a rear connecting rod device 1022.

The front connecting rod device 1021 is connected to the front locking device 105 and is configured to control the front locking device 105 to move backward, to unlock the multiple front universal wheels 103 from the locked state in the horizontal rotation direction.

The rear connecting rod device 1022 is connected to the rear locking device 106 and is configured to control the rear locking device 106 to move forward, to unlock the multiple rear universal wheels 104 from the locked state in the horizontal rotation direction.

It should be noted that, as illustrated in FIG. 3, the unlocking assembly may include the front connecting rod device 1021 and the rear connecting rod device 1022. The front connecting rod device 1021 is connected to the front locking device 105 and may control the front locking device 105 to move backward, thereby unlocking the multiple front universal wheels 103 from the locked state in the horizontal rotation direction. Similarly, the rear connecting rod device 1022 is connected to the rear locking device 106 and may control the rear locking device 106 to move backward, thereby unlocking the multiple rear universal wheels 104 from the locked state in the horizontal rotation direction.

It should also be noted that the material vehicle 10 is connected to a traction apparatus generally, so as to travel to a designated position under traction of the traction apparatus. Therefore, in some embodiments, as illustrated in FIG. 3, the material vehicle 10 may further include a front traction interface 107 and a rear traction interface 108.

The front traction interface 107 is connected to the front connecting rod device 1021 and is configured to: in response to engaging with the traction apparatus and the traction apparatus travelling in the first direction, control the front connecting rod device 1021 to move backward, to unlock the multiple front universal wheels 103 from the locked state in the horizontal rotation direction.

The rear traction interface 108 is connected to the rear connecting rod device 1022 and is configured to: in response to engaging with the traction apparatus and the traction apparatus travelling in the second direction, control the rear connecting rod device 1022 to move forward, to unlock the multiple rear universal wheels 104 from the locked state in the horizontal rotation direction.

It should be noted that the traction apparatus may be various types of devices, such as a latent AGV, a tractor-trailer or the like. The material vehicle 10 may travel in a specified direction through the traction of the traction apparatus. In a specific embodiment, the traction apparatus has a very small size and is capable of turning around by rotating in a bottom space of the material vehicle 10, so as to tow the material vehicle 10 to travel in two opposite directions. In other words, the traction apparatus rotates 180 degrees in place in the bottom space of the material vehicle 10, after the traction apparatus tows the material vehicle 10 to travel in the first direction, to complete the operation of turning around, so that the material vehicle 10 may be towed by the traction apparatus to travel in the second direction. In this way, the traction apparatus may not need to drive out of the bottom space of the material vehicle 10 and occupy additional space for turning around, thereby saving an area of a transport passage.

In order to complete the traction connection, the traction apparatus and the material vehicle 10 need to be arranged with assemblies for traction connection, respectively. Thus, the material vehicle 10 may also include the front traction interface 107 and the rear traction interface 108.

The front traction interface 107 is connected to the front connecting rod device 1021, and when the front traction interface 107 is connected to the traction apparatus, the front connecting rod device 1021 unlocks the multiple front universal wheels 103 from the locked state, so that the material vehicle 10 may travel in the first direction. Similarly, the rear traction interface 108 is connected to the rear connecting rod device 1022, and when the rear traction interface 108 is connected to the traction apparatus, the rear connecting rod device 1022 unlocks the multiple rear universal wheels 104 from the locked state, so that the material vehicle 10 may travel in the second direction.

It should also be noted that specific implementations of the front traction interface 107 and the rear traction interface 108 may include various forms, such as a traction hole, a traction catch, a traction post, a traction bar, a flexible member and the like, as long as traction interface is capable of engaging with the traction apparatus. In addition, the specific implementation forms of the front traction interface 107 and the rear traction interface 108 may be the same or may be different.

That is to say, when a target position is in the first direction of the material vehicle 10, the traction apparatus is connected to the front traction interface 107 and transmits force to the front connecting rod device 1021 through the front traction interface 107, so that the front connecting rod device 1021 may control the front locking device 105 to move backward, and the front locking device 105 is detached from the multiple front universal wheels 103. Therefore, the multiple front universal wheels 103 is unlocked from the locked state, and the multiple front universal wheels 103 serve as driving wheels and the multiple rear universal wheels 104 serve as directional wheels, then the traction apparatus tows the material vehicle 10 to travel in the first direction.

When the target position is in the second direction of the material vehicle 10, the traction apparatus is connected to the rear traction interface 108 and transmits force to the rear connecting rod device 1022 through the rear traction interface 108, so that the rear connecting rod device 1022 may control the rear locking device 106 to move forward, and the rear locking device 106 is detached from the multiple rear universal wheels 104. Therefore, the multiple rear universal wheels 104 is unlocked from the locked state, and the multiple rear universal wheels 104 serve as driving wheels and the multiple front universal wheels 103 serve as directional wheels, then the traction apparatus tows the material vehicle 10 to travel in the second direction.

The embodiments of the disclosure provide a material vehicle, the material vehicle includes a vehicle body, an unlocking assembly, multiple front universal wheels and multiple rear universal wheels. The unlocking assembly, the multiple front universal wheels and the multiple rear universal wheels are connected to a bottom of the vehicle body, and the multiple front universal wheels and the multiple rear universal wheels are in a locked state. The vehicle body is configured to place a target object. The unlocking assembly is configured to unlock the multiple front universal wheels from the locked state in a horizontal rotation direction, and drive the material vehicle to travel in a first direction through the multiple front universal wheels. The unlocking assembly is further configured to unlock the multiple rear universal wheels from the locked state in the horizontal rotation direction, and drive the material vehicle to travel in a second direction through the multiple rear universal wheels. The first direction is opposite to the second direction. In this way, the unlocking assembly may unlock the multiple front universal wheels from the locked state, to enable the multiple front universal wheels to serve as driving wheels. Alternatively, the unlocking assembly may unlock the multiple rear universal wheels from the locked state, to enable the multiple rear universal wheels to serve as driving wheels. Therefore, the material vehicle can change the positions of the driving wheels and realize bidirectional travelling without turning around.

Figure 4:
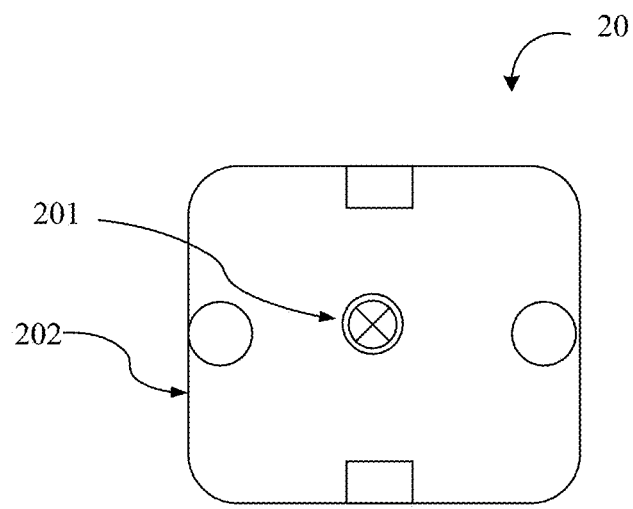
FIG. 4 is a schematic structural diagram of a traction apparatus according to an embodiment of the disclosure.

In another embodiment of the disclosure, FIG. 4 illustrates a schematic structural diagram of a traction apparatus 20 according to an embodiment of the disclosure. As illustrated in FIG. 4, the traction apparatus 20 includes a vehicle body 202 and a traction assembly 201 connected to a top of the vehicle body 202. The traction assembly 201 is configured to control the material vehicle 10 to travel in a first direction or in a second direction after engaging with a material vehicle 10.

It should be noted that the traction apparatus 20 is a power device for towing the material vehicle 10 with the above structure to move. The traction apparatus 20 includes the traction assembly 201 which enables the traction apparatus to be engaged with the material vehicle 10, and then the traction apparatus controls the material vehicle 10 to travel in the first direction or in the second direction. The traction assembly 201 may be implemented by various forms, such as a traction bar, a traction post, a traction rope and the like.

Further, in some embodiments, the traction assembly 201 is configured to control the material vehicle 10 to travel in the first direction after engaging with a front traction interface 107 of the material vehicle 10.

The traction assembly 201 is further configured to control the material vehicle 10 to travel in the second direction after engaging with a rear traction interface 108 of the material vehicle 10.

It should be noted that the material vehicle 10 includes two traction interfaces, namely, the front traction interface 107 and the rear traction interface 108. When the traction assembly 201 of the traction apparatus 20 is engaged with the front traction interface 107, the traction apparatus 20 controls the material vehicle 10 to travel in the first direction. When the traction assembly 201 of the traction apparatus 20 is engaged with the rear traction interface 108, the traction apparatus 20 controls the material vehicle 10 to travel in the second direction.

The embodiment of the disclosure provides a traction apparatus, which at least includes a vehicle body and a traction assembly connected to a top of the vehicle body. The traction assembly is configured to control the material vehicle to travel in a first direction or in a second direction after engaging with the material vehicle. In this way, the material vehicle can be towed to travel in different directions by the traction apparatus.

Figure 5:
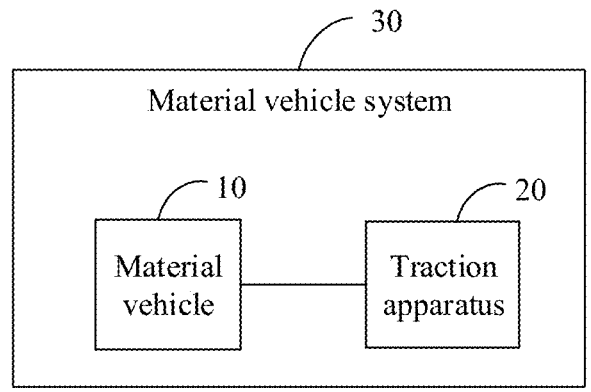
FIG. 5 is a schematic diagram of a composition structure of a material vehicle system according to an embodiment of the disclosure.

In another embodiment of the disclosure, FIG. 5 illustrates a schematic diagram of a composition structure of a material vehicle system according to an embodiment of the disclosure. As illustrated in FIG. 5, the material vehicle system includes the above material vehicle 10 and the above traction apparatus 20.

The traction apparatus 20 is configured to tow the material vehicle to travel in the first direction, and is further configured to tow the material vehicle to travel in the second direction after turning around by rotating in a bottom space of the material vehicle 10. The first direction is opposite to the second direction.

It should be noted that the material vehicle system 30 provided in the embodiment of the disclosure includes the material vehicle 10 and the traction apparatus 20. The structure of the material vehicle 10 is described above and will not be elaborated herein. The traction apparatus 20 has a very small size and is capable of turning around by rotating in the bottom space of the material vehicle 10, so as to be able to tow the material vehicle 10 to travel in two opposite directions.

In other words, the traction apparatus rotates 180 degrees in place in the bottom space of the material vehicle 10, after the traction apparatus tows the material vehicle 10 to travel in the first direction, to complete the operation of turning around, so that the material vehicle 10 may be towed by the traction apparatus to travel in the second direction. In this way, the traction apparatus may not need to drive out of the bottom space of the material vehicle 10 and occupy additional space for turning around, thereby saving an area of a transport passage.

The embodiment of the disclosure provides a material vehicle system which includes the above material vehicle and traction apparatus. The traction apparatus is configured to: tow the material vehicle to travel in the first direction, and tow the material vehicle to travel in the second direction after turning around by rotating in the bottom space of the material vehicle. The first direction is opposite to the second direction. In this way, the traction apparatus can tow the material vehicle in different directions, and the traction apparatus can turn around in the bottom space of the material vehicle and do not need to occupy additional space, thereby saving the area of the transport passage.

Figure 6:
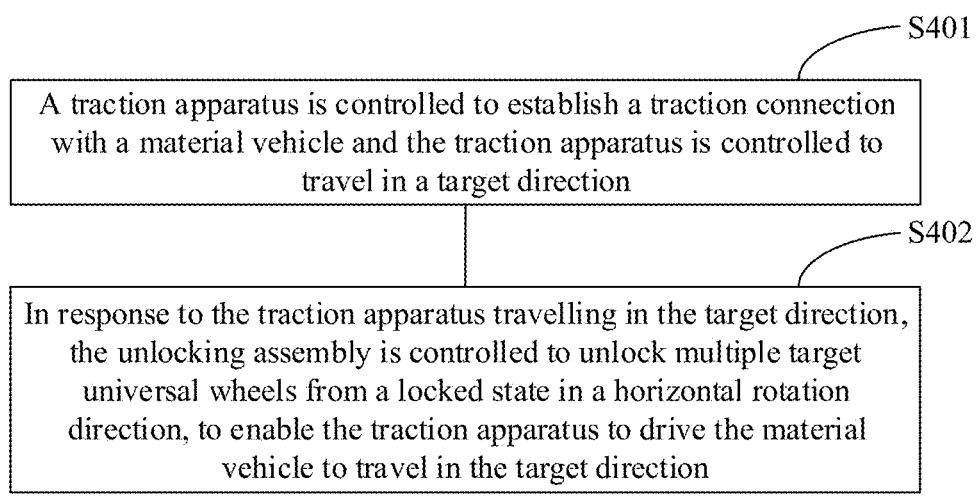
FIG. 6 is a schematic flowchart of a method for controlling a bidirectional travelling of a material vehicle according to an embodiment of the disclosure.

Based on the aforementioned composition structure example of the material vehicle system 30, FIG. 6 illustrates a schematic flowchart of a method for controlling a bidirectional travelling of a material vehicle according to an embodiment of the disclosure. As illustrated in FIG. 6, the method may include the following operations.

At S401, a traction apparatus is controlled to establish a traction connection with a material vehicle and the traction apparatus is controlled to travel in a target direction.

It should be noted that the method for controlling a bidirectional travelling of the material vehicle in the embodiment of the disclosure is applied to the material vehicle system described in the above embodiments. In the material vehicle system, the traction apparatus includes a traction assembly, through which the traction apparatus may establish a traction connection with the material vehicle, and then the traction apparatus is controlled to travel in the target direction, to tow the material vehicle to travel.

At S402, in response to the traction apparatus travelling in the target direction, the unlocking assembly is controlled to unlock multiple target universal wheels from a locked state in a horizontal rotation direction, to enable the traction apparatus to drive the material vehicle to travel in the target direction.

It should be noted that when the traction apparatus travels in the target direction, a traction force of the traction apparatus may control the unlocking assembly to unlock the multiple target universal wheels from the locked state, so that the multiple target universal wheels serve as driving wheels and other universal wheels serve as directional wheels, and the multiple target universal wheels tow the material vehicle to travel in the target direction.

It should also be described that the multiple target universal wheels are the multiple front universal wheels when the target direction is a first direction, and the multiple target universal wheels are the multiple rear universal wheels when the target direction is a second direction, and the first direction is opposite to the second direction.

That is to say, when the traction apparatus travels in the first direction, the traction force of the traction apparatus may control the unlocking assembly to unlock the multiple front universal wheels from the locked state in the horizontal rotation direction, so that the multiple front universal wheels may rotate horizontally freely and serve as the driving wheels, to control the direction when the traction apparatus travels in the first direction. When the traction apparatus travels in the second direction, the traction force of the traction apparatus may control the unlocking assembly to unlock the multiple rear universal wheels from the locked state in the horizontal rotation direction, so that the multiple rear universal wheels may rotate horizontally freely and serve as the driving wheels, to control the direction when the traction apparatus travels in the second direction. The first direction is opposite to the second direction.

Furthermore, in some embodiments, when the target direction is the first direction, the operation that traction apparatus is controlled to establish the traction connection with the material vehicle may include the following operation.

The traction assembly of the traction apparatus is engaged with the front traction interface of the material vehicle.

It should be noted that the traction apparatus includes the traction assembly, the material vehicle includes the front traction interface, and the traction apparatus establishes a tractive connection with the material vehicle by engaging the traction assembly with the front traction interface. Then the multiple front universal wheels are unlocked from the locked state by the means of the traction force of the traction apparatus, so that the traction apparatus can tow the material vehicle to travel in the first direction.

Further, in some embodiments, the operation that the unlocking assembly is controlled to unlock the target universal wheels from the locked state in the horizontal rotation direction may include the following operation.

The unlocking assembly is controlled to move a front locking device of the material vehicle backward, to unlock the multiple front universal wheels from the locked state in the horizontal rotation direction.

It should be noted that for the material vehicle, the front locking device locks multiple front universal wheels, so that the multiple front universal wheels are in the locked state in the horizontal rotation direction. When the traction apparatus is engaged with the front traction interface and the traction apparatus travels in the first direction, the traction force of the traction apparatus may firstly control the unlocking assembly to move the front locking device backward, thereby unlocking the multiple front universal wheels from the locked state in the horizontal rotation direction.

Further, in some embodiments, after the traction apparatus being controlled to drive the material vehicle to travel in the target direction, the method may further include the following operation.

In response to the material vehicle reaching a target position, the traction assembly is controlled to disengage from the front traction interface, and the unlocking assembly is controlled to release the front locking device, to enable the multiple front universal wheels to return to the locked state.

It should be noted that, after the material vehicle is controlled to travel in the first direction and to reach the target position, the traction connection between the traction assembly and the front traction interface is released, so that the front connecting rod device is sprung back and the front locking device is released, thus the front universal wheels return to the locked state. Therefore, the material vehicle may unlock the front universal wheels or the rear universal wheels from the locked state according to the required driving direction next time.

Furthermore, in some embodiments, after the unlocking assembly is controlled to release the front locking device, the method may further include the following operations.

The traction apparatus is controlled to turn around by rotating in a bottom space of the material vehicle.

The traction assembly is engaged with a rear traction interface of the material vehicle, and the traction apparatus is controlled to travel in the second direction.

In response to the traction apparatus traveling in the second direction, the unlocking assembly is controlled to unlock the multiple rear universal wheels from the locked state in the horizontal rotation direction, to enable the traction apparatus to drive the material vehicle to travel in the second direction.

It should be noted that the material vehicle also includes a rear traction interface, which is mainly configured to establish a traction connection with the traction apparatus. Therefore, when the traction apparatus tows the material vehicle to reach the target position in the first direction, the traction apparatus is controlled to turn around by rotating in the bottom space of the material vehicle, so that the traction apparatus may be engaged with the rear traction interface to establish the traction connection, and then the multiple rear universal wheels are unlocked from the locked state by means of the traction force of the traction apparatus.

In addition, after the material vehicle is controlled to travel in the second direction and to reach the target position, the traction connection between the traction assembly and the rear traction interface is released, so that the rear connecting rod device is sprung back and the rear locking device is released, thus the rear universal wheels return to the locked state. In this way, when the traction apparatus needs to tow the material vehicle to travel in the second direction, the traction apparatus may be engaged with the rear traction interface through the traction assembly, and then the unlocking assembly is controlled to unlock the multiple rear universal wheels from the locked state in the horizontal rotation direction, so that the multiple rear universal wheels serve as driving wheels, to control the traction apparatus to drive the material vehicle to travel in the second direction.

In this way, since the traction apparatus has a very small size and is capable of turning around by rotating in the bottom space of the material vehicle, so as to tow the material vehicle to travel in two opposite directions. In other words, the traction apparatus rotates 180 degrees in place in the bottom space of the material vehicle, after the traction apparatus tows the material vehicle to travel in the first direction, to complete the operation of turning around, so that the material vehicle may be towed by the traction apparatus to travel in the second direction. In this way, the traction apparatus may not need to drive out of the bottom space of the material vehicle and occupy additional space for turning around, thereby saving an area of a transport passage.

The embodiment of the disclosure provides a method for controlling a bidirectional travelling of a material vehicle, applied to a material vehicle system. The material vehicle system includes a traction apparatus and a material vehicle. The material vehicle at least includes an unlocking assembly, multiple front universal wheels and multiple rear universal wheels, and the multiple front universal wheels and the multiple rear universal wheels are in a locked state.

According to the method, the traction apparatus is controlled to establish a traction connection with the material vehicle and the traction apparatus is controlled to travel in a target direction. In response to the traction apparatus travelling in the target direction, the unlocking assembly is controlled to unlock multiple target universal wheels from the locked state in a horizontal rotation direction, to enable the traction apparatus to drive the material vehicle to travel in the target direction. The multiple target universal wheels are the multiple front universal wheels when the target direction is a first direction, and the multiple target universal wheels are the multiple rear universal wheels when the target direction is a second direction. The first direction is opposite to the second direction. The traction apparatus is controlled to drive the material vehicle to travel in the target direction through the multiple target universal wheels. In this way, the multiple front universal wheels are changed from directional wheels into driving wheels by being unlocked. Alternatively, the multiple rear universal wheels are changed from the directional wheels into the driving wheels by being unlocked. Therefore, the material vehicle may exchange the positions of the driving wheels and directional wheels, so that the material vehicle may be towed for bidirectional travelling by a unidirectional travelling AGV, which expands the application scenario of the unidirectional travelling AGV. In addition, the traction apparatus may not need to drive out of the bottom space of the material vehicle and occupy additional space for the operation of turning back, thereby saving an area of the transport passage.

Figure 7:
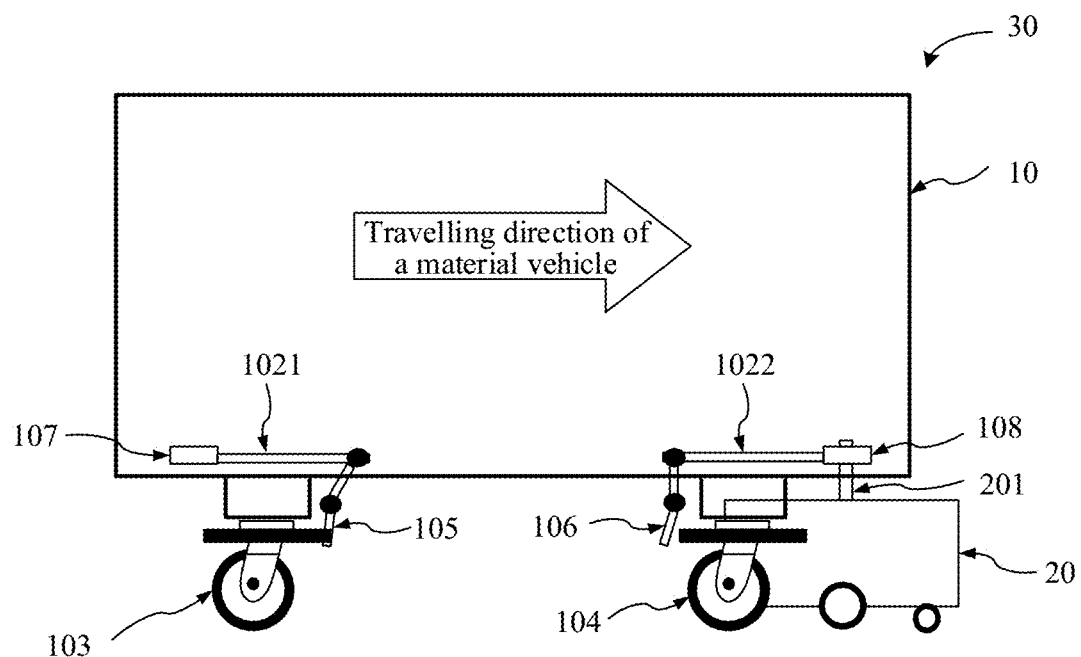
FIG. 7 is a schematic diagram of an application scenario of a material vehicle system according to an embodiment of the disclosure.

In another embodiment of the disclosure, FIG. 7 illustrates a schematic diagram of an application scenario of a material vehicle system 30 according to an embodiment of the disclosure. As illustrated in FIG. 7 the application scenario includes a material vehicle 10 and a traction apparatus 20 and there is a traction connection between the material vehicle 10 and the traction apparatus 20. The traction apparatus 20 has a small size yet a large traction force, that is, the traction apparatus 20 with a small height and a small rotating radius may rotate and freely travel in a bottom space of the material vehicle 10. As illustrated in FIG. 7, a traction assembly 201 (embodied as a traction bar) is arranged at a center of the traction apparatus 20, the traction assembly 201 is retractable. When the material vehicle 10 needs to be towed, the traction apparatus 20 goes under a bottom space of the material vehicle 10, the traction assembly 201 is raised and inserted into the traction interface which is arranged on the material vehicle 10, so as to realize traction for the material vehicle 10. After transporting the material vehicle 10 to a designated position, the traction assembly 201 is descended and detached from the traction interface of the material vehicle 10. At this time, the traction apparatus 20 is separated from the material vehicle 10, and then the traction apparatus 20 drives out of the bottom of the material vehicle 10.

The bottom of the material vehicle 10 is arranged with two front universal wheels 103, two rear universal wheels 104, a front locking device 105, a rear locking device 106, a front connecting rod device 1021, a rear connecting rod device 1022, a front traction interface 107 and a rear traction interface 108. A shaft holder of a universal wheel is provided with a lock hole, and the locking device may be buckled into the lock hole, thus the universal wheels is unable to rotate horizontally. Each of the front locking device 105 and the rear locking device 106 includes two sub-locking devices, and each of the two sub-locking devices is for locking a front universal wheel 103 or a rear universal wheel 104. In other words, when the material vehicle 10 is placed separately, each sub-locking device of the front locking device 105 and the rear locking device 106 are buckled into a respective corresponding universal wheel, so that the universal wheels of the material vehicle 10 are in the locked state.

Figure 8:
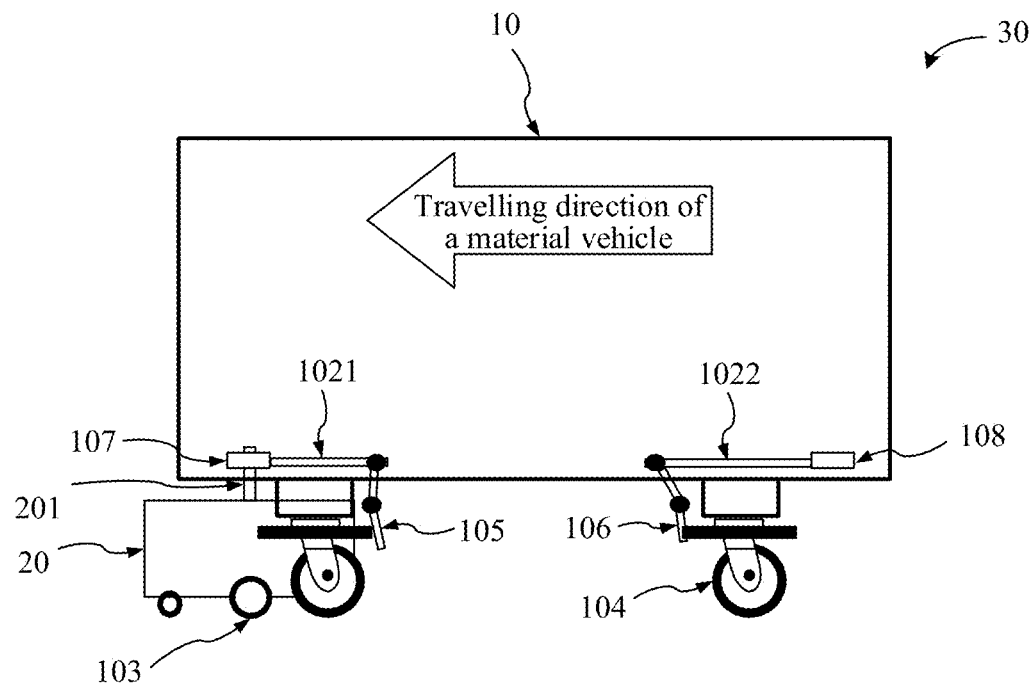
FIG. 8 is a schematic diagram of another application scenario of a material vehicle system according to an embodiment of the disclosure.

FIG. 8 illustrates a schematic diagram of an application scenario of another material vehicle system according to an embodiment of the disclosure. As illustrated in FIG. 7 and FIG. 8, when the traction apparatus 20 needs to tow the material vehicle 10 forward, the traction assembly 201 is raised and inserted into the front traction interface 107 of the material vehicle 10. When the traction apparatus 20 drives the material vehicle 10 forward, the traction force of the traction apparatus 20 is transmitted to the front connecting rod device 1021 through the front traction interface 107, so that the front connecting rod device 1021 drives the front locking device 105 to move backward, and each of the sub-locking devices of the front locking device 105 is detached from a respective locking hole of the corresponding front universal wheel 103, so that the front universal wheels may rotate horizontally. In this way, the two front universal wheels 103 serve as driving wheels and the two rear universal wheels 104 serve as directional wheels, so that the traction apparatus 20 may tow the material vehicle 10 forward. However, if the front universal wheels 103 have an included angle with the vehicle body direction, the sub-locking devices may not be buckled into the corresponding lock holes, and it is necessary to rotate the front universal wheels 103 to be in line with the vehicle body direction, the sub-locking devices may be buckled into the corresponding lock holes, and then the multiple front universal wheels 103 are determined to be in the locked state.

Similarly, when the traction apparatus 20 needs to tow the material vehicle 10 backward, the traction assembly 201 is raised and inserted into the rear traction interface 108 of the material vehicle 10. When the traction apparatus 20 drives the material vehicle 10 backward, the traction force of the traction apparatus 20 is transmitted to the rear connecting rod device 1022 through the rear traction interface 108, so that the rear connecting rod device 1022 drives the rear locking device 106 to move forward, and each of the sub-locking devices of the rear locking device 106 is detached from a respective locking hole of the corresponding rear universal wheel 104, so that the rear universal wheels may rotate horizontally. In this way, the two rear universal wheels 104 serve as driving wheels and the two front universal wheels 103 serve as directional wheels, so that the traction apparatus 20 may tow the material vehicle 10 backward. After reaching a designated position, the traction assembly 201 is descended and detached from the rear traction interface 10, so that the sub-locking devices of the rear locking device 106 locks the rear universal wheels 104. However, if the rear universal wheels 104 have an included angle with the vehicle body direction, the sub-locking devices may not be buckled into the corresponding lock holes, and it is necessary to rotate the rear universal wheels 104 to be in line with the vehicle body direction, the sub-locking devices may be buckled into the corresponding lock holes, and then the multiple rear universal wheels 104 are determined to be in the locked state.

According to the above description, the material vehicle 10 is arranged with four universal wheels which may be locked to prevent from horizontal rotating, and the universal wheels may be unlocked by the connecting rod device under the traction force of the traction apparatus 20, so that the universal wheels may freely rotate horizontally, i.e., these universal wheels have an entire universal wheel function. When the material vehicle 10 is parked separately, the four universal wheels are all in the locked state. Indeed, when the material vehicle 10 is parked, the universal wheels on one side (front or rear) may be manually unlocked, to enable the material vehicle 10 to be manually pushed in a free direction. Based on the structure of the material vehicle 10, the whole operation of the material vehicle 10 towed by the traction apparatus 20 is described as follows.

The traction apparatus 20 travels to a position under the material vehicle 10 and relative a traction hole of the material vehicle, the traction apparatus 20 extends out of a traction bar to engage with the traction hole. The traction apparatus 20 tows the material vehicle 10 forward through the traction bar, and drives the connecting rod device to unlock the universal wheels in the traveling direction, so that the unlocked universal wheels have a function of free rotation in the horizontal direction.

A material vehicle 10 travels to a target work station through a traction force of the traction apparatus 20, the traction bar of the traction apparatus 20 is retracted, while the connecting rod device unlock the lock for locking the rotation of the universal wheels, and the universal wheels may be locked and not rotate only when the direction of the universal wheels is in line with the direction of the material vehicle 10. When there is a certain angle between the universal wheels and the vehicle body, the universal wheels is still able to rotating horizontally. When the universal wheels rotate to a direction which is in line with the direction of the vehicle body, the locking device may immediately lock the universal wheels, so that the universal wheels have the directional wheels performance. After the work at the work station is completed, the traction apparatus 20 travels to the bottom space of the material vehicle 10 again, different from the previous traction operation, the traction apparatus 20 rotates 180 degrees in place in the bottom space of the rear end of the material vehicle 10 and extends the traction bar into the rear traction hole of the material vehicle 10, and then the operations are the same as the above embodiment, so that the bidirectional travelling of the material vehicle 10 is realized by the traction apparatus 20 turning around.

According to the above description, the universal wheels in the embodiments of the disclosure have the following characteristics. (1) When the traction apparatus 20 is connected to the traction interface through the traction bar, the universal wheels on the same side as the traction bar are unlocked. (2) The traction apparatus 20 releases the traction bar, and the universal wheels on the same side as the traction bar are locked.

Accordingly, the key points of the embodiments of the disclosure are described as follows.

(1) A mechanical structure and a material vehicle for automatically switching between universal wheels and directional wheels by a traction force of an AGV.

(2) An AGV with a very small size body yet a large traction force.

(3) A method for a bidirectional travelling of a material vehicle towed by a unidirectional AGV.

(4) A material vehicle with a unique traction apparatus and an AGV with a small size yet a large traction force, a bidirectional travelling of a material vehicle towed by a unidirectional AGV through a unique traction apparatus.

(5) When the AGV towing the material vehicle to turn, the AGV turns a certain degree to have a certain included angle with the travelling direction of the material vehicle, a laser in front of the AGV may safely protect the side of the material vehicle, which may effectively reduce a blind area on the side of the material vehicle when the material vehicle turns.

The embodiment of the disclosure provides a material vehicle system, which includes the above material vehicle and the traction apparatus. The traction apparatus may unlock the multiple front universal wheels in the material vehicle from the locked state, to enable the multiple front universal wheels to serve as driving wheels. Alternatively, the traction apparatus may unlock the multiple rear universal wheels in the material vehicle from the locked state, to enable the multiple rear universal wheels to serve as driving wheels. Therefore, the material vehicle can change the positions of the driving wheels and realize bidirectional travelling without turning around.

Figure 9:
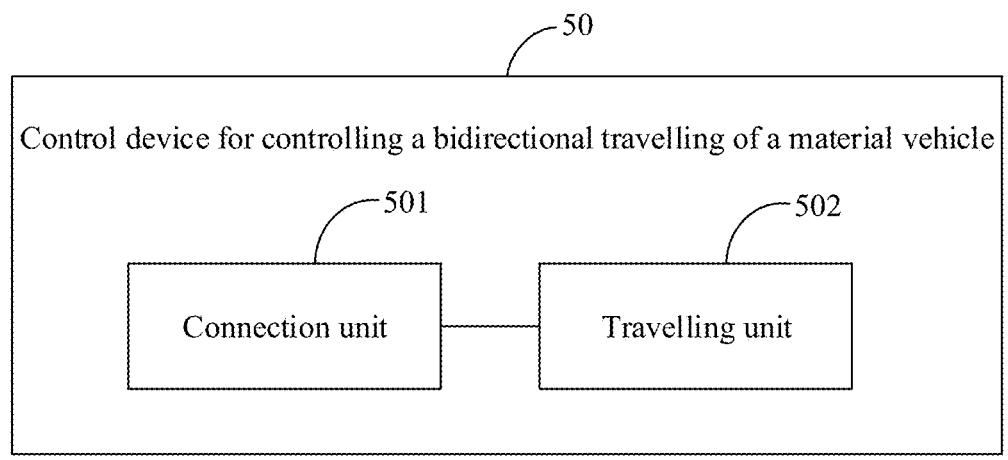
FIG. 9 is a schematic diagram of a composition structure of a control device according to an embodiment of the disclosure.

In another embodiment of the disclosure, FIG. 9 illustrates a schematic diagram of a composition structure of a control device 50 according to an embodiment of the disclosure. The control device 50 is applied to a material vehicle system, the material vehicle system includes a traction apparatus and a material vehicle. The material vehicle at least includes an unlocking assembly, multiple front universal wheels and multiple rear universal wheels. The multiple front universal wheels and multiple rear universal wheels are in a locked state. As illustrated in FIG. 9, the control device 50 includes a connection unit 501 and a travelling unit 502.

The connection unit 501 is configured to control the traction apparatus to establish a traction connection with the material vehicle and control the traction apparatus to travel in a target direction.

The travelling unit 502 configured to: in response to the traction apparatus travelling in the target direction, control the unlocking assembly to unlock multiple target universal wheels from the locked state in a horizontal rotation direction, to enable the traction apparatus to drive the material vehicle to travel in the target direction. The multiple target universal wheels are the multiple front universal wheels when the target direction is a first direction, and the multiple target universal wheels are the multiple rear universal wheels when the target direction is a second direction, and the first direction is opposite to the second direction.

In some embodiments, in response to the target direction being the first direction, the travelling unit 502 is further configured to engage a traction assembly of the traction apparatus with a front traction interface of the material vehicle.

In some embodiments, the travelling unit 502 is further configured to control the unlocking assembly to move a front locking device of the material vehicle backward, to unlock the multiple front universal wheels from the locked state in the horizontal rotation direction.

In some embodiments, the travelling unit 502 is further configured to, in response to the material vehicle reaching a target position, control the traction assembly to disengage with the front traction interface, and control the unlocking assembly to release the front locking device, to enable the multiple front universal wheels to return to the locked state.

In some embodiments, the travelling unit 502 is further configured to: control the traction apparatus to turn around by rotating in a bottom space of the material vehicle, engage the traction assembly with a rear traction interface of the material vehicle and control the traction apparatus to travel in the second direction; and in response to the traction apparatus traveling in the second direction, control the unlocking assembly to unlock the multiple rear universal wheels from the locked state in the horizontal rotation direction, to enable the traction apparatus to drive the material vehicle to travel in the second direction.

It should be understood that in the embodiment, a "unit" may be part of a circuit, part of a processor, part of a program or software and the like. The "unit" may also be a module, or be non-modular. Moreover, each component in the embodiments may be integrated in a processing unit, or each unit may exist physically alone, or two or more units may be integrated in one unit. The integrated unit described above may be implemented in the form of hardware or in the form of a software function module.

If the integrated unit is implemented in the form of the software function module and is not sold or used as an independent product, the integrated unit may be stored in a computer readable storage medium. Based on such understanding, the technical solution essentially, or the part of the technical solution that contributes to the related art, or the whole or part of the technical solution of the embodiments may be embodied in the form of a software product. The computer software product is stored in a storage medium and includes a number of instructions to enable a computer device (which may be a personal computer, a server, a network device, or the like) or a processor to perform all or part of the steps of the method described in the embodiments. The storage medium may include: a universal serial bus (USB) flash disk, a portable hard disk, a read only memory (ROM), a random access memory (RAM), a magnetic disk, an optical disk, or other mediums capable of storing program codes.

Thus, an embodiment provides a computer storage medium having stored thereon a program for controlling a bidirectional travelling of a material vehicle, the program for controlling the bidirectional travelling of the material vehicle is executed by at least one processor to implement the steps of the method of any one of the previous embodiments.

Figure 10:
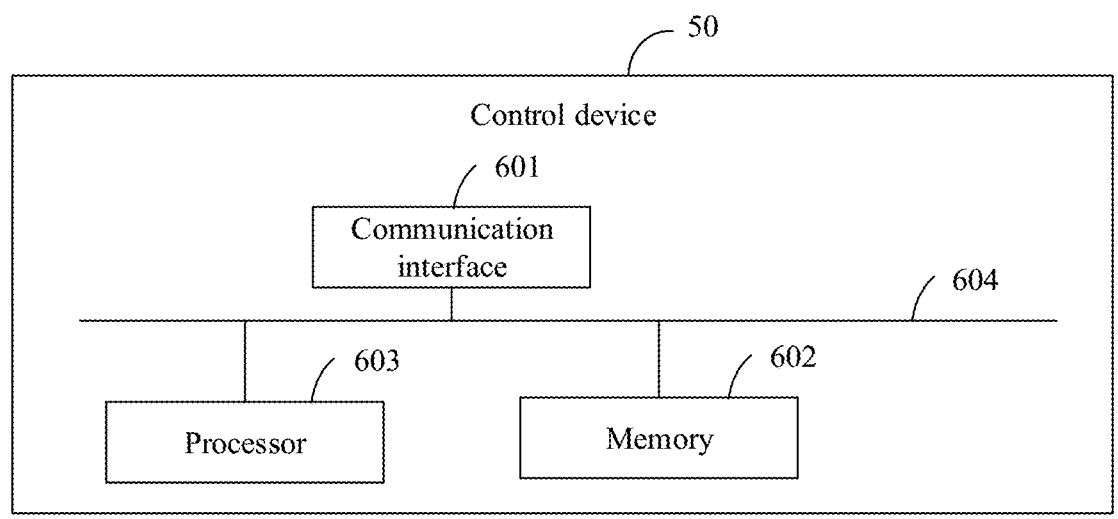
FIG. 10 is a schematic diagram of a specific hardware structure of a control device according to an embodiment of the disclosure.

According to the composition of a control device 50 and a computer storage medium described above, FIG. 10 illustrates a schematic diagram of a specific hardware structure of a control device according to an embodiment of the disclosure. As illustrated in FIG. 10, the control device 50 may include: a communication interface 601, a memory 602 and a processor 603. The various components are coupled together by a bus device 604. It can be understood that the bus device 604 is used for implementing communications between these components. In addition to a data bus, the bus device 604 includes a power bus, a control bus and a status signal bus. However, for clarity, the various buses are labeled as bus device 604 in FIG. 10. The communication interface 601 is used for receiving and sending signals during a process of sending and receiving information with other external network elements.

The memory 602 is configured to store a computer program capable of running on the processor 603.

The processor 603 is configured to execute the following operations when running the computer program.

The traction apparatus is controlled to establish a traction connection with the material vehicle and the traction apparatus is controlled to travel in a target direction.

In response to the traction apparatus travelling in the target direction, the unlocking assembly is controlled to unlock multiple target universal wheels from the locked state in a horizontal rotation direction, to enable the traction apparatus to drive the material vehicle to travel in the target direction. The multiple target universal wheels are the multiple front universal wheels when the target direction is a first direction, and the multiple target universal wheels are the multiple rear universal wheels when the target direction is a second direction. The first direction is opposite to the second direction.

It can be understood that the memory 602 in embodiments of the disclosure may be a volatile memory, a non-volatile memory, or including both the volatile memory and the non-volatile memory. The non-volatile memory may be an ROM, a programmable ROM (PROM), an erasable PROM (EPROM), an electrically EPROM (EEPROM), or a flash memory. The volatile memory may be an RAM which serves as an external cache. By a way of illustration but not limitation, many forms of RAM are available, such as a static RAM (SRAM), a dynamic RAM (DRAM), a synchronous DRAM (SDRAM), a double data rate SDRAM (DDRSDRAM), an enhanced SDRAM (ESDRAM), a synchronous link DRAM (SLDRAM), and a direct rambus RAM (DRRAM). The memory 602 of the device and the method described herein is intended to include but not limited to these and any other suitable types of memories.

The processor 603 may be an integrated circuit chip with a signal processing capability. The steps of the above method may be accomplished by a integrated logic circuit of hardware in processor 603 or instructions in the form of software during the process of implementation. The processor 603 described above may be a general processor, a digital signal processor (DSP), an application specific integrated circuit (ASIC), a field programmable gate array (FPGA) or other programmable logic devices, a discrete gate or a transistor logic device, or a discrete hardware component, and may implement or perform the various methods, steps and logic block diagrams disclosed in embodiments of the disclosure. The general processor may be a microprocessor or t any conventional processor or the like. The steps of the method disclosed in the embodiments of the disclosure may be directly executed by a hardware decoding processor or by a combination of the hardware in the hardware decoding processor and software modules. The software module may be located in an RAM, a flash memory, an ROM, a PROM or an EEPROM, a register and other storage medium mature in the art. The storage medium is in the memory 602, and the processor 603 reads information in the memory 602 and completes the steps of the above method in combination with hardware thereof.

It will be understood that the embodiments described herein may be implemented by hardware, software, firmware, middleware, microcode or a combination thereof. For the hardware implementation, a processing unit may be implemented in one or more ASICs, DSPs, DSP devices (DSPDs), programmable logic devices (PLDs), field-programmable gate arrays (FPGAs), general processors, controllers, microcontrollers, microprocessors, other electronic units for performing the functions described herein, or the combinations thereof.

For the software implementation, the technical solution described herein may be implemented by modules (for example, procedures, functions and the like) that perform the functions described herein. The software codes may be stored in memory and executed by the processor. The memory can be realized inside of the processor or outside of the processor.

Alternatively, in another embodiment, the processor 603 is further configured to, when running the computer program, execute the steps of the method of any one of the previous embodiments.

The control device 50 in the embodiment of the disclosure may be integrated in a traction apparatus, and the traction apparatus may unlock the multiple front universal wheels from the locked state, to enable the multiple front universal wheels to serve as driving wheels. Alternatively, for the material vehicle, the unlocking assembly may unlock the multiple rear universal wheels from the locked state, to enable the multiple rear universal wheels to serve as driving wheels. Therefore, the material vehicle can change the positions of the driving wheels and realize bidirectional travelling without turning around.

The above description is only preferred embodiments of the disclosure and is not intended to limit the scope of protection of the disclosure.

It should be noted that, in the disclosure, the terms "comprising", "including" or any other variations thereof are intended to encompass non-exclusive inclusion, so that a process, method, object or device which includes various elements includes not only those elements but also other elements that are not explicitly listed, or elements inherent in the process, method, object or device. Without further limitations, an element defined by the phrase "including a . . . " does not exclude the existence of another identical element in the process, method, object or device which includes the element.

The above serial numbers of the embodiments of the disclosure are for description only and do not represent the advantages and disadvantages of the embodiments.

The methods disclosed in several method embodiments provided in the disclosure may be arbitrarily combined without conflict to obtain new method embodiments.

The features disclosed in several product embodiments provided in the disclosure may be arbitrarily combined without conflict to obtain new product embodiments.

The features disclosed in several method or device embodiments provided in the disclosure may be arbitrarily combined without conflict to obtain new method embodiments or device embodiments.

The above descriptions are only the specific implementations of the disclosure, and the scope of protection of the disclosure is not limited thereto. Changes or substitutions obvious to person familiar with the technical field within the technical scope disclosed in the disclosure should be covered within the scope of protection of the disclosure. Therefore, the scope of protection of the disclosure shall be subject to the scope of protection of the claims.

INDUSTRIAL APPLICABILITY

In the embodiments of the disclosure, a material vehicle includes a vehicle body, an unlocking assembly, multiple front universal wheels and multiple rear universal wheels. The multiple front universal wheels and the multiple rear universal wheels are in a locked state. The vehicle body is configured to place a target object. The unlocking assembly is configured to unlock the multiple front universal wheels from the locked state in a horizontal rotation direction, and drive the material vehicle to travel in a first direction through the multiple front universal wheels. The unlocking assembly is further configured to unlock the multiple rear universal wheels from the locked state in the horizontal rotation direction, and drive the material vehicle to travel in a second direction through the multiple rear universal wheels. The first direction is opposite to the second direction. In this way, the unlocking assembly may unlock the multiple front universal wheels from the locked state or unlock the multiple rear universal wheels from the locked state, to enable the material vehicle to change the positions of the driving wheels and realize bidirectional travelling without turning around.

What is claimed is:

1. A material vehicle, towed by a traction apparatus, the material vehicle comprising a vehicle body, an unlocking assembly, a plurality of front universal wheels, a plurality of rear universal wheels, a front locking device, a rear locking device, a front traction interface, and a rear traction interface, wherein the unlocking assembly comprises a front connecting rod device connected to the front traction interface, and a rear connecting rod device connected to the rear traction interface and separated from the front connecting rod device, wherein the unlocking assembly, the plurality of front universal wheels and the plurality of rear universal wheels are connected to a bottom of the vehicle body, the plurality of front universal wheels are connected to the front locking device and are in a locked state through control of the front locking device, and the plurality of rear universal wheels are connected to the rear locking device and are in a locked state through control of the rear locking device, wherein the vehicle body is configured to place a target object;

the unlocking assembly is configured to unlock the plurality of front universal wheels from the locked state in a horizontal rotation direction in response to the traction apparatus engaging with the front traction interface and being separated from the rear traction interface and the traction apparatus travelling in a first direction, and the material vehicle is driven to travel in the first direction when the unlocked plurality of front universal wheels are driven by the traction apparatus travelling in the first direction; and the unlocking assembly is further configured to unlock the plurality of rear universal wheels from the locked state in the horizontal rotation direction in response to the traction apparatus engaging with the rear traction interface and being separated from the front traction interface and the traction apparatus travelling in a second direction, and the material vehicle is driven to travel in the second direction when the unlocked plurality of rear universal wheels are driven by the traction apparatus travelling in the second direction, and wherein the first direction is opposite to the second direction.

2. The material vehicle of claim 1, wherein the front locking device is configured to control the plurality of front universal wheels to be in the locked state in the horizontal rotation direction; and the rear locking device is configured to control the plurality of rear universal wheels to be in the locked state in the horizontal rotation direction.

3. The material vehicle of claim 2, wherein the front connecting rod device is connected to the front locking device and configured to control the front locking device to move backward, to unlock the plurality of front universal wheels from the locked state in the horizontal rotation direction; and the rear connecting rod device is connected to the rear locking device and configured to control the rear locking device to move forward, to unlock the plurality of rear universal wheels from the locked state in the horizontal rotation direction.

4. The material vehicle of claim 3, wherein the front traction interface is configured to: in response to the front traction interface engaging with the traction apparatus and the traction apparatus travelling in the first direction, control the front connecting rod device to move backward, to unlock the plurality of front universal wheels from the locked state in the horizontal rotation direction; and the rear traction interface is configured to: in response to the rear traction interface engaging with the traction apparatus and the traction apparatus travelling in the second direction, control the rear connecting rod device to move forward, to unlock the plurality of rear universal wheels from the locked state in the horizontal rotation direction.

5. A material vehicle system, at least comprising a traction apparatus and a material vehicle towed by the traction apparatus, wherein
the material vehicle comprises a vehicle body, an unlocking assembly, a plurality of front universal wheels, a plurality of rear universal wheels, a front locking device, a rear locking device, a front traction interface, and a rear traction interface, wherein the unlocking assembly comprises a front connecting rod device connected to the front traction interface, and a rear connecting rod device connected to the rear traction interface and separated from the front connecting rod device, wherein the unlocking assembly, the plurality of front universal wheels and the plurality of rear universal wheels are connected to a bottom of the vehicle body of the material vehicle, the plurality of front universal wheels are connected to the front locking device and are in a locked state through control of the front locking device, and the plurality of rear universal wheels are connected to the rear locking device and are in a locked state through control of the rear locking device, wherein
the vehicle body of the material vehicle is configured to place a target object;
the unlocking assembly is configured to unlock the plurality of front universal wheels from the locked state in a horizontal rotation direction in response to the traction apparatus engaging with the front traction interface and being separated from the rear traction interface and the traction apparatus travelling in a first direction, and the material vehicle is driven to travel in the first direction when the unlocked plurality of front universal wheels are driven by the traction apparatus travelling in the first direction; and
the unlocking assembly is further configured to unlock the plurality of rear universal wheels from the locked state in the horizontal rotation direction in response to the traction apparatus engaging with the rear traction interface and being separated from the front traction interface and the traction apparatus travelling in a second direction, and the material vehicle is driven to travel in the second direction when the unlocked plurality of rear universal wheels are driven by the traction apparatus travelling in the second direction, wherein the first direction is opposite to the second direction; and
the traction apparatus comprises a vehicle body and a traction assembly connected to a top of the vehicle body of the traction apparatus; the traction apparatus is configured to:
tow the material vehicle to travel in the first direction after engaging with the front traction interface of the material vehicle; and
tow the material vehicle to travel in the second direction after turning around by rotating in a bottom space of the material vehicle and engaging with the rear traction interface of the material vehicle.

6. The material vehicle system of claim 5, wherein
the front locking device is configured to control the plurality of front universal wheels to be in the locked state in the horizontal rotation direction; and
the rear locking device is configured to control the plurality of rear universal wheels to be in the locked state in the horizontal rotation direction.

7. The material vehicle system of claim 6, wherein
the front connecting rod device is connected to the front locking device and configured to control the front locking device to move backward, to unlock the plurality of front universal wheels from the locked state in the horizontal rotation direction; and
the rear connecting rod device is connected to the rear locking device and configured to control the rear locking device to move forward, to unlock the plurality of rear universal wheels from the locked state in the horizontal rotation direction.

8. The material vehicle system of claim 7, wherein
the front traction interface is configured to: in response to the front traction interface engaging with the traction apparatus and the traction apparatus travelling in the first direction, control the front connecting rod device to move backward, to unlock the plurality of front universal wheels from the locked state in the horizontal rotation direction; and
the rear traction interface is configured to: in response to the rear traction interface engaging with the traction apparatus and the traction apparatus travelling in the second direction, control the rear connecting rod device to move forward, to unlock the plurality of rear universal wheels from the locked state in the horizontal rotation direction.

9. The material vehicle system of claim 5, wherein
the traction assembly is configured to, after engaging with the front traction interface of the material vehicle and being separated from the rear traction interface of the material vehicle, control the material vehicle to travel in the first direction; or
the traction assembly is configured to, after engaging with the rear traction interface of the material vehicle and being separated from the front traction interface of the material vehicle, control the material vehicle to travel in the second direction.

10. A method for controlling a bidirectional travelling of a material vehicle, applied to a material vehicle system comprising a traction apparatus and the material vehicle towed by the traction apparatus, the material vehicle at least comprising an unlocking assembly, a plurality of front universal wheels, a plurality of rear universal wheels, a front locking device, a rear locking device, a front traction interface, and a rear traction interface, wherein the unlocking assembly comprises a front connecting rod device connected to the front traction interface, and a rear connecting rod device connected to the rear traction interface and separated from the front connecting rod device, wherein the plurality of front universal wheels are connected to the front locking device and are in a locked state through control of the front locking device, and the plurality of rear universal wheels are connected to the rear locking device and are in a locked state through control of the rear locking device; and the method comprises:
controlling the traction apparatus to establish a tractive connection with the material vehicle and controlling the traction apparatus to travel in a first or second direction;
in response to the traction apparatus engaging with the front traction interface and being separated from the rear traction interface and travelling in the first direction, controlling the unlocking assembly to unlock the plurality of front universal wheels from the locked state in a horizontal rotation direction, to enable the traction apparatus to drive the material vehicle to travel in the first direction through the plurality of front universal wheels; and in response to the traction apparatus engaging with the rear traction interface and being separated from the front traction interface and travelling in the second direction, controlling the unlocking assembly to unlock the plurality of rear universal wheels from the locked state in the horizontal rotation direction, to enable the traction apparatus to drive the material vehicle to travel in the second direction through the plurality of rear universal wheels, wherein the first direction is opposite to the second direction.

11. The method of claim 10, wherein in response to the traction apparatus engaging with the front traction interface and being separated from the rear traction interface and travelling in the first direction, controlling the traction apparatus to establish the tractive connection with the material vehicle comprises engaging a traction assembly of the traction apparatus with the front traction interface of the material vehicle.

12. The method of claim 11, wherein controlling the unlocking assembly to unlock the plurality of front universal wheels from the locked state in the horizontal rotation direction comprises controlling the unlocking assembly to move the front locking device of the material vehicle backward, to unlock the plurality of front universal wheels from the locked state in the horizontal rotation direction.

13. The method of claim 12, wherein after enabling the traction apparatus to drive the material vehicle to travel in the first direction, the method further comprises in response to the material vehicle reaching a target position, controlling the traction assembly to disengage from the front traction interface, and controlling the unlocking assembly to release the front locking device, to enable the plurality of front universal wheels to return to the locked state.

14. The method of claim 13, wherein after controlling the unlocking assembly to release the front locking device, the method further comprises:
  controlling the traction apparatus to turn around by rotating in a bottom space of the material vehicle; and
  engaging the traction assembly with the rear traction interface of the material vehicle and controlling the traction apparatus to drive the material vehicle to travel in the second direction.

15. A non-transitory computer storage medium having stored thereon a computer program that, when being executed, implements operations of the method of claim 10.

* * * * *